United States Patent

Francis

[19]

[11] Patent Number: 6,022,289
[45] Date of Patent: Feb. 8, 2000

[54] SYNCHRONIZED RANGE SHIFT MECHANISM FOR TRANSFER CASE

[75] Inventor: Philip J. Francis, Lapeer, Mich.

[73] Assignee: New Venture Gear, Inc., Troy, Mich.

[21] Appl. No.: 09/212,808

[22] Filed: Dec. 16, 1998

[51] Int. Cl.[7] .................................................... F16H 3/54
[52] U.S. Cl. .......................... 475/320; 475/204; 475/303
[58] Field of Search ................................ 475/198, 204, 475/206, 221, 295, 303, 317, 320, 321, 322; 180/248

[56] References Cited

U.S. PATENT DOCUMENTS

| | | |
|---|---|---|
| 4,569,252 | 2/1986 | Harper . |
| 4,667,538 | 5/1987 | Larsson ............................. 475/303 X |
| 5,054,335 | 10/1991 | Andrews ............................ 74/665 GA |
| 5,346,442 | 9/1994 | Eastman ................................. 475/223 |
| 5,390,347 | 2/1995 | Buri et al. ............................. 475/303 |
| 5,651,749 | 7/1997 | Wilson et al. ......................... 475/221 |
| 5,655,986 | 8/1997 | Wilson et al. ......................... 475/204 |
| 5,697,861 | 12/1997 | Wilson .................................. 475/198 |
| 5,704,867 | 1/1998 | Bowen .................................. 475/221 |
| 5,836,847 | 11/1998 | Pritchard .............................. 475/204 |

Primary Examiner—Sherry L. Estremsky
Attorney, Agent, or Firm—Harness, Dickey & Pierce, P.L.C.

[57] ABSTRACT

A transfer case for a four-wheel drive vehicle having a planetary gear assembly and a synchronized range clutch which can be selectively shifted on-the-move for establishing four-wheel high-range and low-range drive modes.

39 Claims, 7 Drawing Sheets

SYNCHRONIZED RANGE SHIFT MECHANISM FOR TRANSFER CASE

BACKGROUND OF THE INVENTION

The present invention relates generally to transfer cases for use in four-wheel drive vehicles. More particularly, the present invention relates to a transfer case having a synchronized range shift mechanism for on-the-move shifting between high-range and low-range drive modes.

The drivetrain in many light-duty and sport-utility vehicles includes a transfer case for transmitting drive torque to all four of the wheels, thereby establishing a four-wheel drive mode of operation. To accommodate differing road surfaces and conditions, some transfer cases are equipped with a gear reduction unit which can be selectively shifted by the vehicle operator to establish four-wheel high-range and low-range drive modes. In many instances, however, the vehicle must be stopped before the transfer case can be shifted between its four-wheel high-range and low-range drive modes. Unfortunately, the need to stop the vehicle prior to such range shifting is inconvenient, particularly upon encountering road conditions or surface terrains where continuation of the vehicle's rolling momentum would assist in overcoming the conditions encountered. As such, some gear reduction units are adapted to permit the vehicle operator to shift from the four-wheel low-range drive mode into the four-wheel high-range drive mode without stopping the vehicle. For example, U.S. Pat. No. 5,054,335 discloses a transfer case equipped with a synchronized range shift arrangement for on-the-move shifting of a layshaft-type gear reduction unit. Alternatively, commonly-owned U.S. Pat. No. 5,346,442 discloses a transfer case having a synchronized range shift arrangement for on-the-move shifting of a planetary-type gear reduction unit. Finally, U.S. Pat. Nos. 4,569,252, 5,651,749, 5,655,986, 5,697,861 and 5,704,867 disclose transfer cases equipped with planetary-type gear reduction units which permit synchronized shifting between the high-range and low-range drive modes. Thus, a recognized need exists to develop synchronized range shift systems for use in four-wheel drive transfer cases that advance the current technology.

SUMMARY OF THE INVENTION

It is therefore an object of the present invention to provide a transfer case for a four-wheel drive vehicle having a planetary gear assembly and a range shift mechanism which can be selectively actuated for establishing a four-wheel high-range drive mode, a neutral mode, and a four-wheel low-range drive mode.

As a related object of the present invention, the range shift mechanism includes synchronizers for permitting "on-the-move" shifting of the transfer case into the four-wheel high-range and low-range drive modes.

According to a preferred embodiment of the present invention, the planetary gear assembly is operably installed between an input member and an output member and includes a ring gear, a sun gear fixed for rotation with the input member, a planet carrier fixed for rotation with the output member, and a set of pinion gears meshed with the ring gear and sun gear and which are rotatably supported from the planet carrier. The synchronized range shift mechanism includes a range sleeve coupled for rotation with the ring gear and sliding movement thereon between first and second range positions to respectively establish first and second drive connections between the input member and the output member. In its first range position, the range sleeve is coupled with a first clutch plate that is fixed for rotation with the output member. With the range sleeve in its first range position, the output member is driven by the input member at a first speed ratio to define a high-range drive mode. In its second range position, the range sleeve is coupled with a second clutch plate that is non-rotatably fixed to a stationary component. With the range sleeve in its second range position, the output member is driven by the input member at a second speed ratio to define a low-range drive mode. The range sleeve can also be moved to a third range position whereat it is uncoupled from both of the first and second clutch plates to disconnect the output member from the input member and establish a Neutral non-driven mode.

Additional objects, features and advantages of the present invention will become apparent from studying the following detailed description and appended claims when taken in conjunction with the accompanying drawings.

DETAILED DESCRIPTION OF THE PREFERRED EMBODIMENTS

In general, the present invention relates to a planetary gear assembly and a synchronized range shift mechanism installed in a transfer case of the type used in the drivetrain of a four-wheel drive vehicle and which permit "on-the-move" shifting of the transfer case between a low-range drive mode and a high-range drive mode during motive operation of the motor vehicle.

Figure 1:
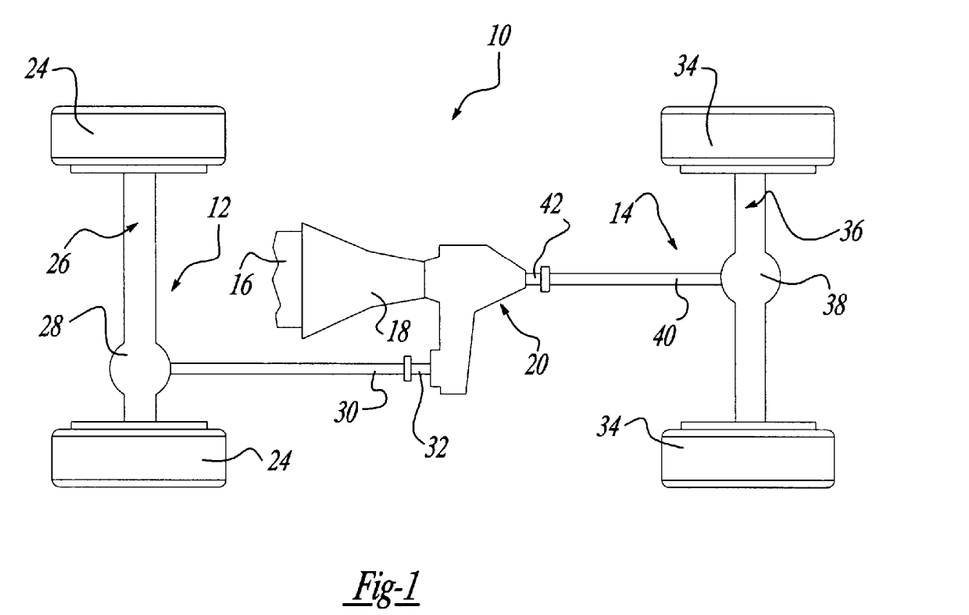
FIG. 1 illustrates the drivetrain of a four-wheel drive motor vehicle equipped with the transfer cases of the present invention.

With particular reference to FIG. 1 of the drawings, a drivetrain 10 for a four-wheel drive vehicle is shown. Drivetrain 10 includes a first or front driveline 12 and a second or rear driveline 14 both drivable from a source of power, such as an engine 16, through a transmission 18 which may be of either the manual or automatic type. In the particular embodiment shown, drivetrain 10 is a four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear propshaft 40, the opposite end of which is interconnected to a rear output shaft 42 of transfer case 20.

Figure 2:
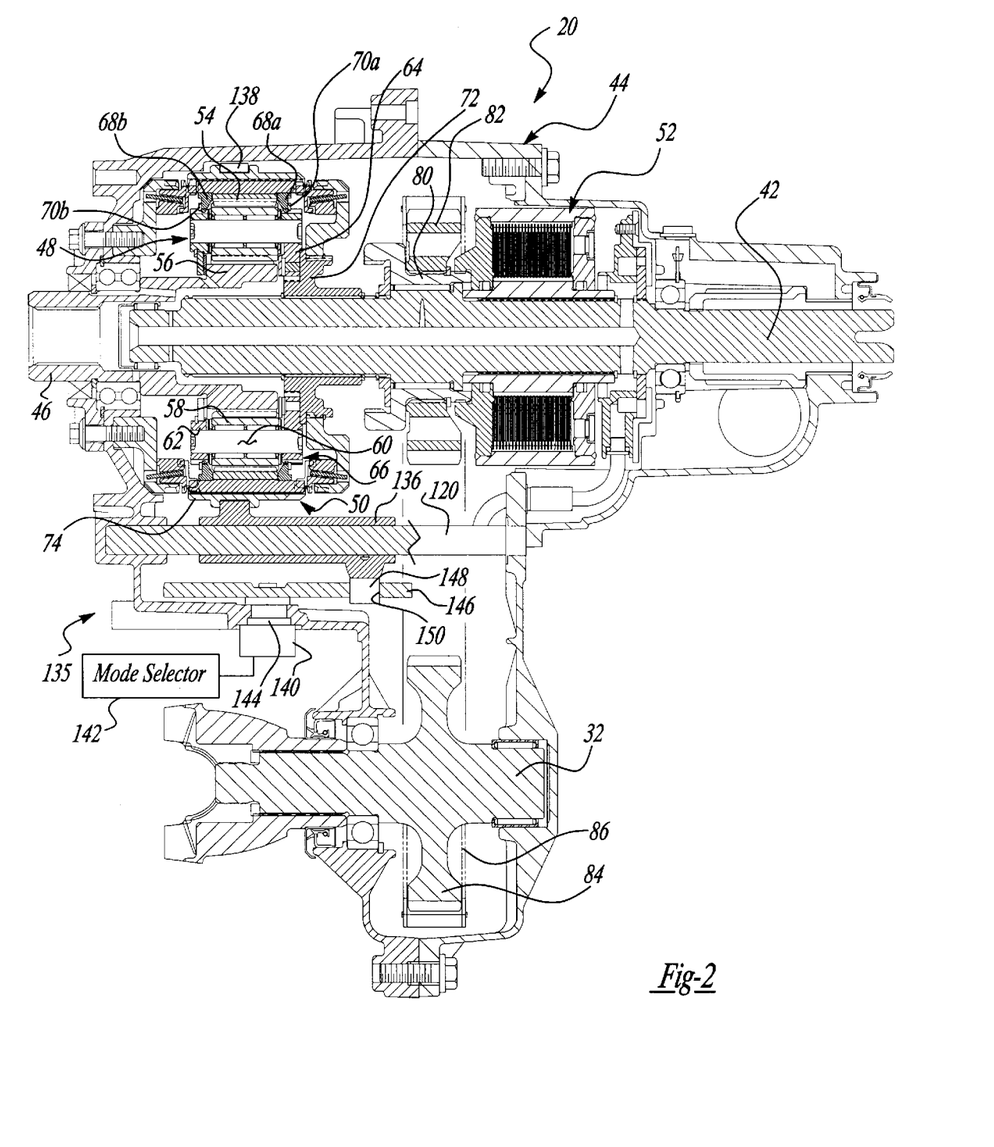
FIG. 2 is a sectional view of a transfer case equipped with a planetary gear assembly and a synchronized range shift mechanism according to the present invention.

Transfer case 20 includes a housing 44 and an input shaft 46 rotatably supported from housing assembly 44. Input shaft 46 is adapted for connection to an output shaft (not shown) of transmission 18 such that both are rotatably driven by engine 16 of the motor vehicle. As seen, rear output shaft 42 is rotatably supported between input shaft 46 and housing 44 while front output shaft 32 is rotatably supported from housing 44. Transfer case 20 is also shown to include a planetary gear assembly 48, a synchronized range shift mechanism 50, and a transfer clutch 52. Planetary gear assembly 48 includes a ring gear 54, a sun gear 56 fixed for rotation with input shaft 46, and a set of pinion gears 58 which are each rotatably supported on a pinion shaft 60 and meshed with sun gear 56 and ring gear 54. Each pinion shaft 60 extends between a front carrier ring 62 and a rear carrier ring 64 which are interconnected to define a planet carrier 66. Front and rear thrust rings 68a and 68b are respectively fixed (i.e., splined) for rotation with front and rear carrier rings 62 and 64 and are axially retained thereon via snap rings 70a and 70b. Thrust rings 68a and 68b act to support ring gear 54 for rotation relative to planet carrier 66 while maintaining the axial position of ring gear 54 relative to planet carrier 66. Rear carrier ring 64 is fixed (i.e., splined) for rotation with an output member, hereinafter referred to as carrier hub 72, which, in this particular embodiment, is fixed (i.e., splined) for rotation with rear output shaft 42.

Planetary gear assembly 48 functions as a two-speed gear reduction unit which, in cooperation with a range clutch 74 of synchronized range shift mechanism 50, is operable to establish a first or high-range drive connection between input shaft 46 and carrier hub 72 by coupling ring gear 54 for rotation with a first clutch plate 76 that is fixed (i.e., splined) with carrier hub 72. When the first drive connection is established, ring gear 54 is effectively coupled for common rotation with planet carrier 66. Thus, the first drive connection establishes a high-range drive mode in which carrier hub 72 is driven by input shaft 46 at a first (i.e., direct) speed ratio. Likewise, a second or low-range drive connection is established between input shaft 46 and carrier hub 72 by coupling ring gear 54 to a second clutch plate 78 that is fixed to housing 44. When the second drive connection is established, ring gear 54 is braked against rotation and planet carrier 66 is driven by input shaft 46. Thus, the second drive connection establishes a low-range drive mode in which carrier hub 72 is driven at a second (i.e., reduced) speed ratio with respect to input shaft 46. A Neutral mode is established when range clutch 74 uncouples ring gear 54 from both first clutch plate 76 and second clutch plate 78 such that carrier hub 72 is not driven by input shaft 46. As will be detailed, synchronized range shift mechanism 50 is operable for permitting transfer case 20 to be shifted "on-the-move" between its high-range and low-range drive modes.

Transfer case 20 includes a transfer mechanism for transferring drive torque from rear output 42 through transfer clutch 52 to front output shaft 32. The transfer mechanism is shown to include a drive hub 80 rotatably supported on rear output shaft 46, a first sprocket 82 fixed to drive hub 80, a second sprocket 84 fixed to front output shaft 32, and a power chain 86 interconnecting first and second sprockets 82 and 84. Transfer clutch 52 is, in the particular embodiment shown, a hydromechanical coupling having a clutch pack 88 defined by alternatively interleaved clutch plates 90 and 92 mounted respectively for rotation with a clutch hub 94 and a drum 96 surrounding clutch hub 94. Clutch hub 94 is fixed (i.e., splined) for rotation with rear output shaft 42 and drum 96 includes a front end plate 98 that is fixed (i.e., splined) to one of drive hub 80 or first sprocket 82. Transfer clutch 52 automatically controls torque distribution and speed differentiation between rear output shaft 46 and first output shaft 32 in response to and as a function of the amount of relative rotation (i.e., interaxle slip) therebetween. As shown, transfer clutch 52 functions to transfer drive torque to front output shaft 32 via the transfer mechanism to establish an on-demand four-wheel drive mode.

Figure 3:
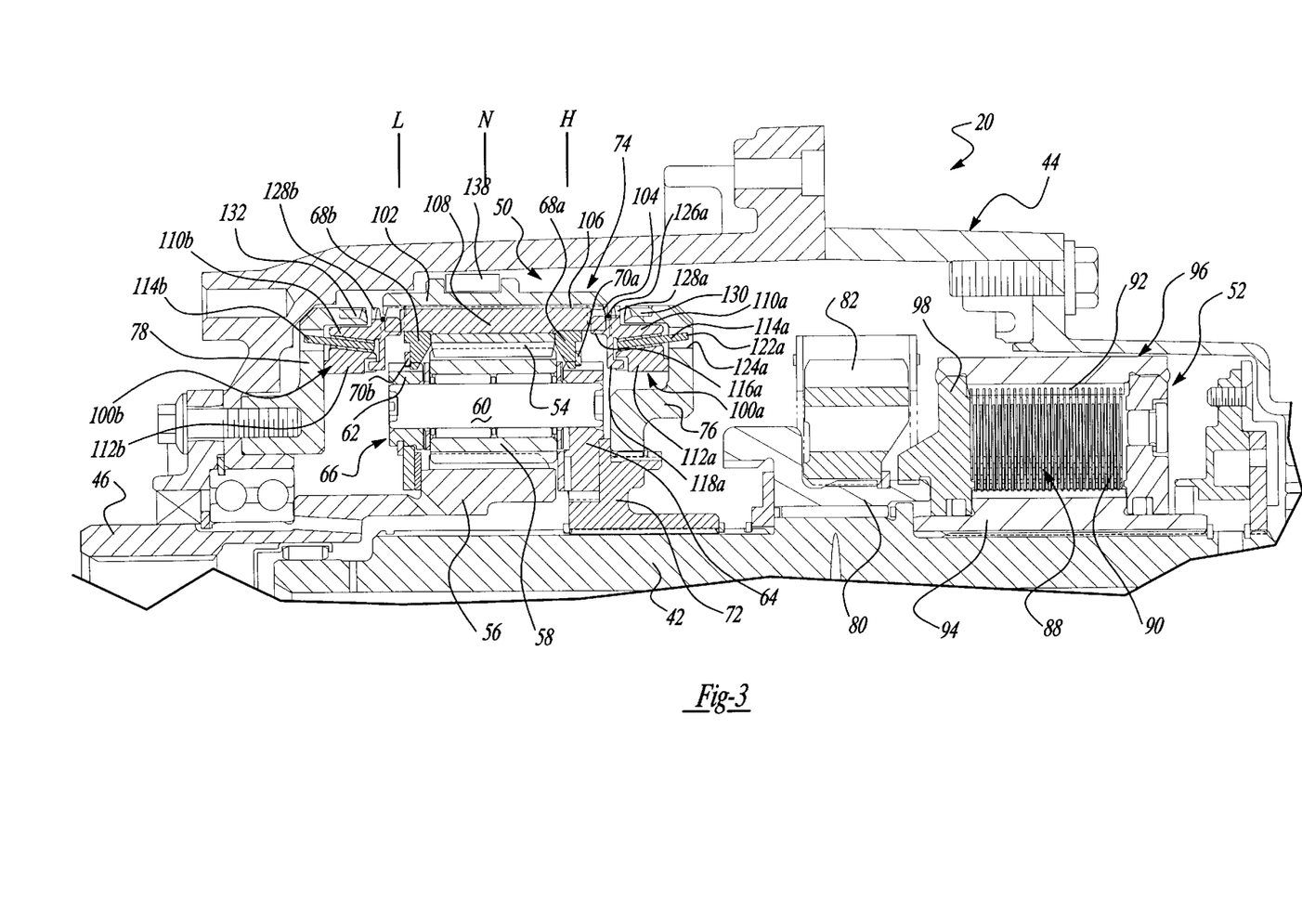
FIG. 3 is a partial sectional view of the planetary gear assembly and the synchronized range shift mechanism shown in FIG. 2.

With continued reference to FIGS. 2 and 3, synchronized range shift mechanism 50 is shown to include range clutch 74, a first synchronizer assembly 100a disposed between range clutch 74 and first clutch plate 76, and a second synchronizer assembly 100b disposed between range clutch 74 and second clutch plate 78. Range clutch 74 is a range sleeve 102 having a set of internal longitudinal splines 104 maintained in constant mesh with external longitudinal splines 106 formed on a hub segment 108 of ring gear 54. Thus, range sleeve 102 is mounted for rotation with ring gear 54 and is further supported for bi-directional sliding movement relative thereto. First synchronizer assembly 100a includes a blocker ring 110a defining an inner cone surface, an inner cone ring 112a defining an outer cone surface, and a friction ring 114a disposed between the inner and outer cone surfaces. Lugs 116a on blocker ring 110a are seated in corresponding edge slots formed in hub segment 108 of ring gear 54 such that blocker ring 110a is rotatable with ring gear 54. Furthermore, tabs 118a on blocker ring 110a are retained in edge slots formed in inner cone ring 112a. Friction ring 114a is shown to include end tabs 122a that are nested within corresponding apertures 124a formed in first clutch plate 76. An energizing spring 126a is retained in a groove formed between lugs 116a and index teeth 128a on blocker ring 110a. Since the components of second synchronizer assembly 100b are substantially similar to those described for first synchronizer assembly 100a, common reference numerals are used with the "a" and "b" suffixes indicating such commonality.

With range sleeve 102 in a neutral position (denoted by position line "N"), its spline teeth 104 are disengaged from meshed engagement with clutch teeth 130 on first clutch plate 76. First synchronizer assembly 100a is operable for causing speed synchronization between input shaft 46 and carrier hub 72 in response to movement of range sleeve 106 from its N position toward a high-range position (denoted by position line "H"). Once the speed synchronization process is completed, spline teeth 104 on range sleeve 102 are permitted to move through index teeth 128a of blocker ring 110a and into meshed engagement with clutch teeth 130 on first clutch plate 76. Accordingly, with range sleeve 102 positioned in its H position, it couples ring gear 54 to first clutch plate 76 such that carrier hub 72 is coupled to rotate at the same speed as input shaft 46 for establishing the first drive connection therebetween. Thus, when the first drive connection is established, the high-range drive mode is established for delivering rotary power to rear output shaft 42.

Second synchronizer assembly 100b is operable to cause speed synchronization between ring gear 54 and housing 44 in response to movement of range sleeve 102 from its N position toward a low-range position (denoted by position line "L"). Once speed synchronization is complete, spline teeth 104 on range sleeve 102 move through index teeth 128b on blocker ring 110b and into meshed engagement with clutch teeth 132 on second clutch plate 78. With range sleeve 102 positioned in its L position, ring gear 54 is coupled to housing 44 and sun gear 56 drives pinion gears 58 about stationary ring gear 54 such that planet carrier 66 and carrier hub 72 are driven at the reduced speed ratio relative to input shaft 46, thereby establishing the second drive connection and the low-range drive mode. When range sleeve 102 is in its N position, no drive torque is transferred to carrier hub 72, thereby establishing the Neutral mode. Range sleeve 102 is designed such that its spline teeth 104 maintain engagement with spline teeth 106 on hub segment 108 of ring gear 54 throughout the entire length of axial travel of range sleeve 102 between its H and L positions.

To provide means for moving range sleeve 102 between its three range positions, transfer case 20 includes a shift system 135 comprised of a shaft 120 mounted to housing 44, a sleeve 136 slideably mounted on shaft 120, a range fork 138 fixed to sleeve 136 and engaging range sleeve 102, an actuator 140 for causing axial movement of sleeve 136 and range fork 138, and a mode select operator 142 for selectively actuating actuator 140. As shown in FIG. 2, actuator 140 is a gearmotor/encoder assembly having a rotary output 144 fixed to a sector plate 146. A follower pin 148 fixed to sleeve 136 is retained in a range slot 150 formed in sector plate 146. Sleeve 136 is slideably mounted on shaft 120 such that bi-directional rotation of output 144 and sector plate 146 caused by actuation of actuator 140 results in bi-directional axial translation of range fork 138, thereby moving range sleeve 102 between its three distinct range positions. The direction and amount of rotation of output 144 is controlled in response to an electric control signal sent to the gearmotor/encoder assembly when the vehicle operator selects a desired drive mode via manipulation of mode select operator 142. The vehicle operator is permitted to select from high-range and low-range drive modes and the Neutral mode. Mode select operator 142 can be a gearshift lever or push-button/rotary switches. As an alternative, sector plate 142 can be caused to rotate via manual operation of a mechanically-actuated shift linkage which is connected to a gearshift lever. Furthermore, it is contemplated that any manually or power-operated shift system known for use in conventional two-speed transfer cases can be used in place of the particular arrangement shown.

Figure 4:
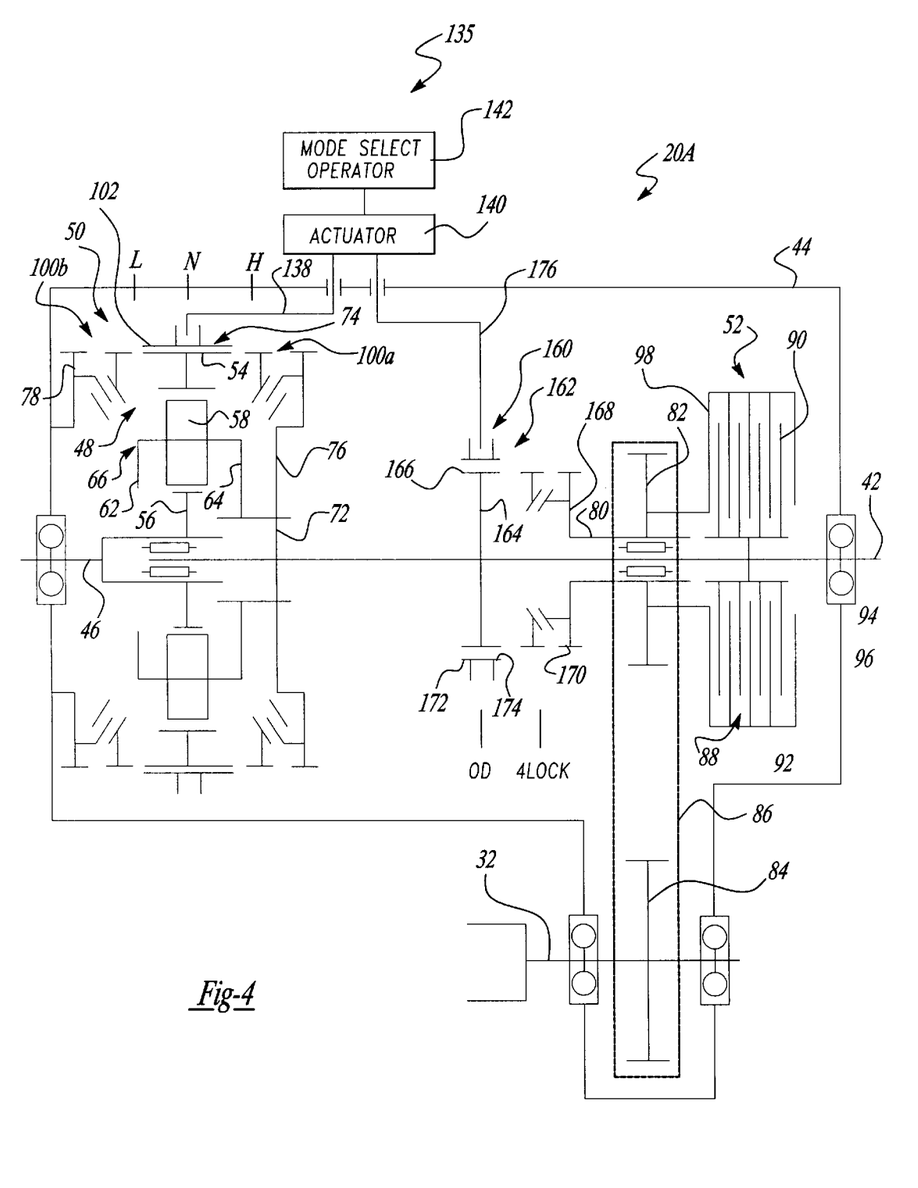
FIG. 4 is a schematic illustration of the transfer case shown in FIG. 2 optionally equipped with a synchronized mode shift mechanism.

Referring now to FIG. 4, a transfer case 20A, which is a modified version of transfer case 20, is schematically shown optionally equipped to include a mode shift mechanism 160 for permitting selection of a locked four-wheel drive mode in addition to the on-demand four-wheel drive mode. Mode shift mechanism 160 includes a mode clutch 162 which can be actuated for selectively coupling rear output shaft 42 to drive hub 80 to establish the locked four-wheel drive mode. In those two-speed transfer case constructions where no transfer clutch 52 is required, mode clutch 162 functions to selectively establish either of a two-wheel drive mode or the locked four-wheel drive mode.

Mode clutch 162 includes a driven hub 164 fixed to rear output shaft 42 and a mode clutch plate 168 fixed to drive hub 80. Mode clutch 162 also includes a mode sleeve 172 having internal splines 174 that are in constant mesh with external splines 166 on driven hub 164 such that mode sleeve 172 can be slid axially relative thereto. With mode sleeve 172 in a first or locked four-wheel drive mode position, denoted by position line "4LOCK", its spline teeth 174 are in meshed engagement with clutch teeth 170 on mode clutch plate 168. In this first mode position, rear output shaft 42 is coupled to drive hub 80 such that driven rotation of carrier hub 72 causes drive torque to be distributed equally between rear output shaft 42 and front output shaft 32 while permitting no speed differentiation therebetween, thereby establishing the locked four-wheel drive mode. In contrast, axial movement of mode sleeve 172 from its 4LOCK mode position to a second or on-demand mode position, denoted by position line "OD", causes teeth 174 on mode sleeve 172 to disengage clutch teeth 170 on clutch plate 168. In this second mode position, drive hub 80 is uncoupled from rear output 42 to permit relative rotation between output shafts 32 and 42 with transfer clutch 52 controlling torque distribution therebetween.

Referring still to FIG. 4, shift system 135 associated with transfer case 20A is shown to additionally include a mode fork 176 which couples mode sleeve 172 to actuator 140. Actuator 140 can be any suitable arrangement that is operable to cause coordinated axial movement of range sleeve 102 and mode sleeve 172 in response to a particular drive mode selected by the vehicle operator through mode select operator 142. Preferably, sector plate 146 has a mode camming arrangement similar to the above-noted range camming arrangement for facilitating coordinated axial movement of shift forks 138 and 176 in a manner generally similar to that described in commonly owned U.S. Pat. No. 5,076,112. Alternatively, transfer case 20A can include a pair of independently controlled actuators for separately controlling movement of shift forks 138 and 176.

Figure 5:
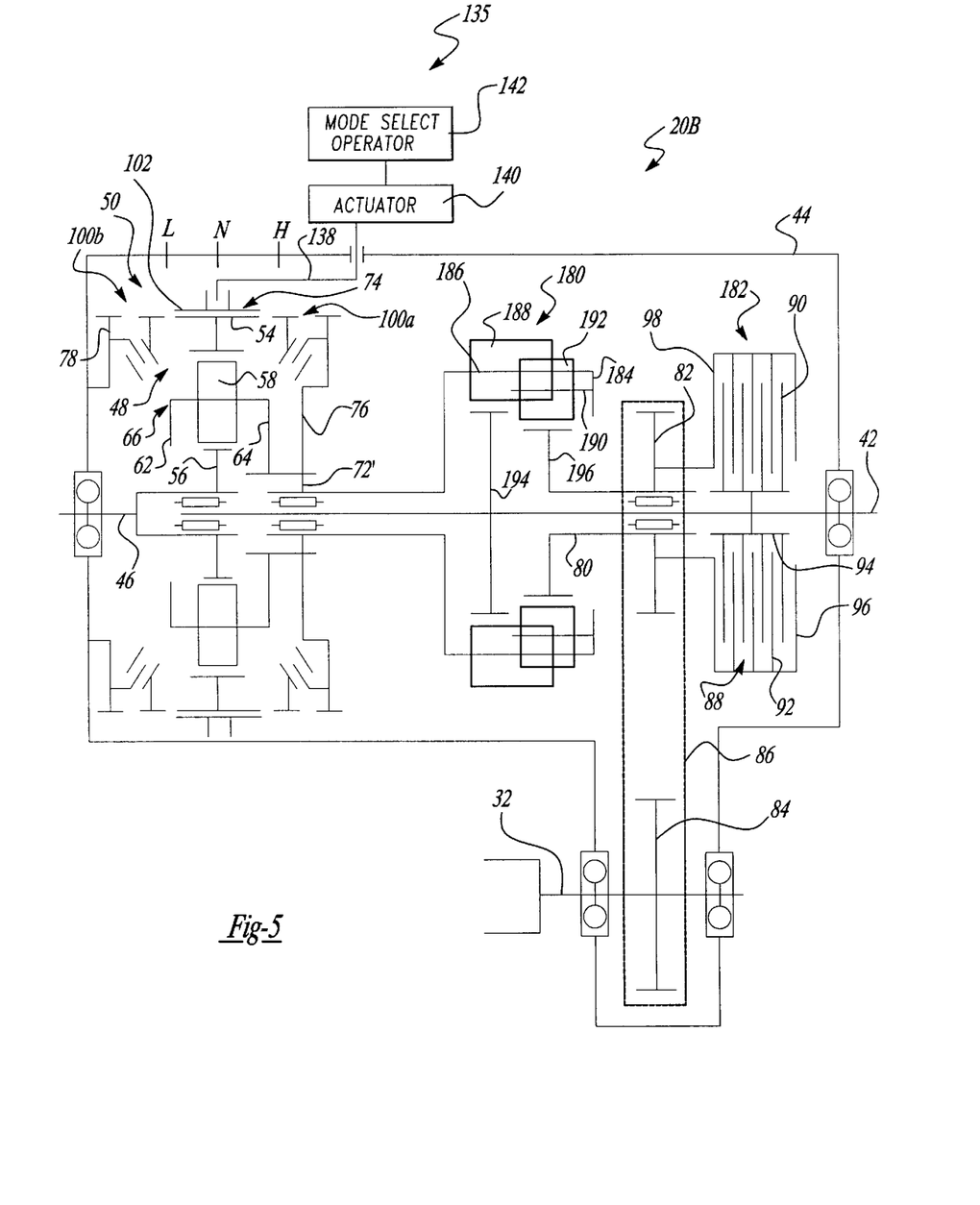
FIG. 5 is a schematic illustration of the transfer case shown in FIG. 2 optionally equipped with a differential assembly.

Referring to FIG. 5, a transfer case 20B, which is another modified version of transfer case 20, is schematically shown equipped with a differential assembly 180 and a biasing clutch 182 in place of transfer clutch 52. Interaxle differential 180 functions to permit speed differentiation between front output shaft 32 and rear output shaft 42 to establish a differentiated or full-time four-wheel drive mode. In this embodiment, a carrier hub 72' is rotatably supported on rear output shaft 42 and, when driven by carrier 66 at either of the first and second speed ratios, acts as the input to interaxle differential 180. Differential 180 includes a carrier assembly 184 fixed for rotation with carrier hub 72' and having long pinion shafts 186 on which long pinions 188 are rotatably supported, and short pinion shafts 190 on which short pinions 192 are rotatably supported. Long pinions 188 mesh with a second sun gear 194 and short pinions 192 mesh with a third sun gear 196. In addition, pairs of long pinions 188 and short pinions 190 are meshed. Second sun gear 194 is fixed for rotation with rear output shaft 42 and acts as a first output of interaxle differential 180. Similarly, third sun gear 196 is fixed for rotation with drive hub 80 and acts as a second output of interaxle differential 180. As such, torque delivered to carrier assembly 184 is delivered to rear output shaft 42 and front output shaft 32 through sun gears 194 and 196 while facilitating speed differentiation therebetween to establish the full-time four-wheel drive modes.

To provide means for controlling torque biasing and speed differentiation between front output shaft 32 and rear output shaft 42, transfer case 20B is equipped with biasing clutch 182. Biasing clutch 182 is normally operable for permitting speed differentiation between front output shaft 32 and rear output shaft 42, thereby establishing the full-time four-wheel drive mode. Biasing clutch 182 is actuated for progressively regulating the torque bias and speed differentiation in response to and as a function of the amount of relative rotation (i.e., interaxle slip) between front output shaft 32 and rear output shaft 42. The torque versus slip characteristics of biasing clutch 182 can be tuned to meet specific vehicular applications. Biasing clutch 182 is a hydromechanical coupling and includes a clutch pack 88 having alternately interleaved clutch plates 90 and 92 mounted respectively for rotation with clutch hub 94 and drum 96. A clutch engagement force operable for transferring torque to the slower turning clutch plate, can, for example, be generated in response to viscous shear (i.e., viscous couplings), hydraulic pressure (i.e., geared traction units) or in any other manner known in torque transfer devices. If desired, a mode shift mechanism similar to that previously described could be positioned between drum 96 and rear output shaft 42 for selectively preventing rotation therebetween and permitting selection of either full-time or locked four-wheel drive modes.

Figure 6:
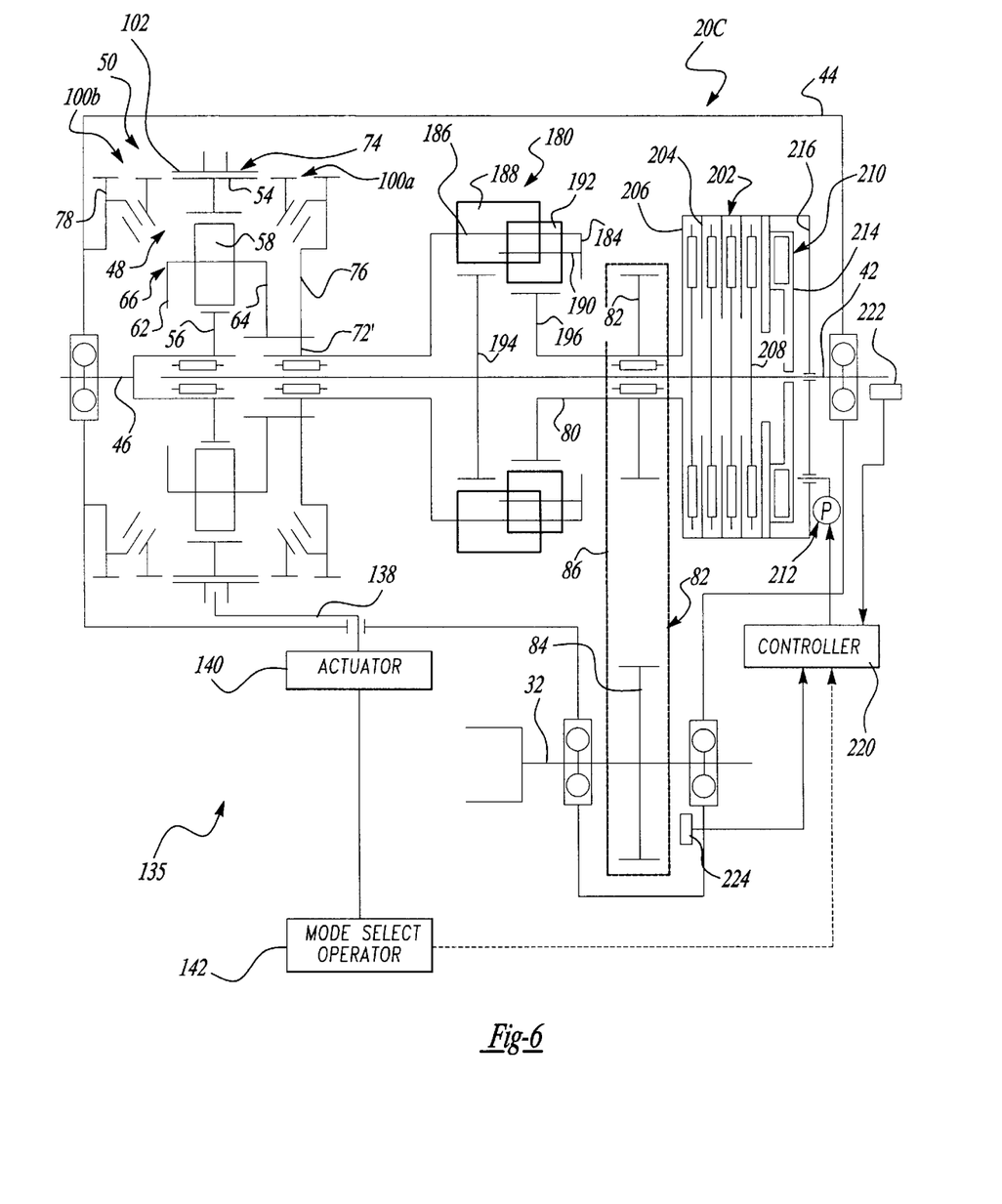
FIGS. 6 and 7 are schematic illustrations of the transfer case shown in FIG. 5 optionally equipped with different biasing clutches.

FIG. 6 schematically illustrates a transfer case 20C which is a modified version of transfer case 20B. In particular, transfer case 20C is equipped with a biasing clutch 202 having a set of outer clutch plates 204 fixed to a drum assembly 206 which is fixed for rotation with drive hub 80, and a set of inner clutch plates 208 fixed for rotation with rear output shaft 42 and which are alternatively interleaved with outer clutch plates 156 to define a clutch pack. Biasing clutch 202 further includes a thrust mechanism 210 for exerting a clutch engagement force on the clutch pack and an actuator 212 for controlling the magnitude of the clutch engagement force as a function of the amount of interaxle slip. In the particular embodiment shown, thrust mechanism 210 is a piston 214 which is axially movable within a pressure chamber 216 of biasing clutch 202 for movement relative to the clutch pack. As shown, actuator 212 is a pump which supplies high pressure hydraulic fluid from a sump to pressure chamber 216 for controlling the axial position of piston 214 relative to the clutch pack and, as such, the clutch engagement force exerted thereon.

Pump 212 can be a shaft driven device, such as a gerotor pump or a gear pump, in which the output pressure generated and supplied to pressure chamber 216 is proportional to the speed difference between front output shaft 32 and rear output shaft 42. With such a shaft-driven type of pump 212, the position of piston 214 in pressure chamber 216 and the clutch engagement force exerted on the clutch pack is progressive and is likewise generally proportional to the speed difference between output shafts 32 and 42. Alternatively, biasing clutch 202 can be electronically-controlled with the output pressure generated by pump 212 automatically regulated using a control system having a controller 220 which receives input signals from various vehicle sensors such as, for example, a rear speed sensor 222 and a front speed sensor 224. Controller 220 determines the real time value of the speed difference from the sensor signals supplied by speed sensors 222 and 224 and sends a control signal to an electrically-controlled type of pump 212 which regulates its output pressure as a function of the control signal. With either arrangement, valving could be used to tune the clutch engagement characteristic of piston 214 in chamber 216 and return springs could be used to return piston 214 to a released position relative to the clutch pack.

Controller 220 can be programmed to regulate the actuated condition of biasing clutch 202 between its non-actuated and fully-actuated limits for varying the magnitude of speed differentiation and drive torque transmitted across differential 180 as a function of the sensor input signals. If transfer case 20C is equipped with the electrically-controlled hydraulic system, then mode select operator 142 could be adapted to permit the vehicle driver to select between full-time four-wheel high-range and low-range modes with automatic clutch control, locked four-wheel high-range and low-range drive modes, and the Neutral mode. In the progressive systems, a mode lock-out clutch can be provided to selectively couple drum 206 to rear output shaft 42 to establish locked four-wheel drive modes.

Figure 7:
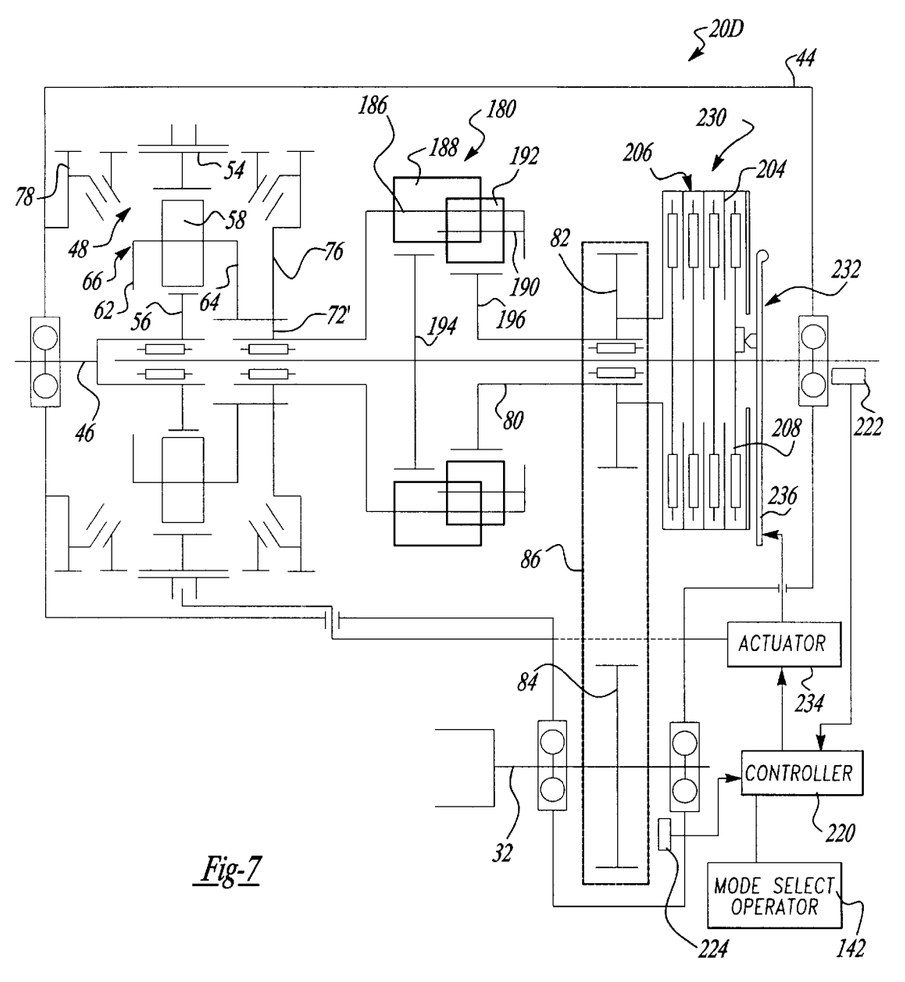

FIG. 7 schematically illustrates a transfer case 20D equipped with a mechanically-actuated biasing clutch 230. In particular, biasing clutch 230 is an electronically-controlled clutch assembly operably disposed between front output shaft 32 and rear output shaft 42 to automatically control the magnitude of the speed differentiation and modify the torque distribution ratio therebetween. Biasing clutch 230 has a thrust mechanism 232 for exerting a clutch engagement force on the clutch pack with an actuator 234 controlling the magnitude of the clutch engagement force as a function of the value of interaxle slip. In particular, thrust mechanism 232 includes a pivotable lever arm assembly 236. Again, controller 220 controls the frictional biasing applied by biasing clutch 230 in response to a control signal generated based on the value of the sensor input signals. Preferably, actuator 234 facilitates coordinated movement of range sleeve 102 and lever arm assembly 236 to permit the vehicle operator to select, via actuation of mode operator 142, full-time four-wheel high-range and low-range drive modes, a neutral mode, and locked four-wheel high-range and low-range drive modes. In the full-time four-wheel drive modes, biasing clutch 230 is controlled automatically to regulate torque biasing and slip across differential 180. When one of the locked four-wheel drive modes is selected, biasing clutch 230 is held in its fully-actuated state. Obviously, the mode selections described above can also be made available with biasing clutch 230 of transfer case 20D if operator 142 supplies controller 220 with a signal indicating the particular mode selected.

The foregoing discussion discloses and describes various embodiment of the present invention. To this end, it is contemplated that the hydraulically-actuated (FIG. 6) and mechanically-actuated (FIG. 7) electronically-controlled clutch systems associated with the biasing clutches could likewise be used in transfer case 20 to automatically control the clutch actuation characteristics of transfer clutch 52. Thus, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for use in a four-wheel drive vehicle having a power source and first and second drivelines comprising:

a housing;

an input shaft rotatably supported by said housing and driven by the power source;

a first output shaft rotatably supported by said housing and connected to the first driveline;

a second output shaft rotatably supported by said housing and connected to the second driveline;

a planetary gear assembly having a sun gear fixed for rotation with said input shaft, a ring gear having external splines, and a planet carrier fixed for rotation with said second output shaft, said planet carrier rotatably supporting planet gears that are meshed with said sun gear and said ring gear;

a first clutch plate fixed for rotation with said second output shaft;

a second clutch plate fixed to said housing;

a range sleeve having internal splines meshed with said external splines of said ring gear such that said range sleeve is coupled for rotation with said ring gear and is axially movable thereon between a first range position and a second range position, said range sleeve is operable in said first range position to couple said ring gear for common rotation with said first clutch plate to establish a high-range drive mode, and said range sleeve is operable in said second range position to couple said ring gear to said second clutch plate to establish a low-range drive mode;

a shift system for moving said range sleeve between said first and second range positions to establish one of said high-range and low-range drive modes; and a transfer mechanism for transferring drive torque from said second output shaft to said first output shaft.

2. The transfer case of claim 1 wherein said range sleeve is movable to a neutral position whereat said range sleeve is disengaged from both of said first and second clutch plates.

3. The transfer case of claim 1 further comprising a pair of thrust rings located on opposite lateral sides of said ring gear and which are fixed for rotation with said planet carrier, said thrust rings supporting said ring gear for rotation relative to said planet carrier while preventing axial movement of said ring gear.

4. The transfer case of claim 1 further comprising a carrier hub fixed for rotation with said second output shaft, and wherein said first clutch plate and said planet carrier are fixed for rotation with said carrier hub.

5. The transfer case of claim 1 further comprising a first synchronizer disposed between said range sleeve and said first clutch plate for inhibiting movement of said range sleeve into its first range position until speed synchronization is established therebetween, and a second synchronizer disposed between said range sleeve and second clutch plate for inhibiting movement of said range sleeve to its second range position until speed synchronization is established therebetween.

6. The transfer case of claim 1 wherein said transfer mechanism includes a first sprocket rotatably supported from said second output shaft, a second sprocket fixed to said first output shaft, a power chain interconnecting said first sprocket to said second sprocket, and a clutch for rotatively coupling said second output shaft to said first sprocket.

7. The transfer case of claim 6 wherein said clutch is a mode clutch operable for selectively coupling said first sprocket to said second output shaft to establish a locked four-wheel drive mode, said mode clutch is operable for selectively uncoupling said first sprocket from said second output shaft to establish a two-wheel drive mode.

8. The transfer case of claim 6 wherein said clutch is a transfer clutch operable for automatically coupling said first sprocket to said second output shaft to establish an on-demand four-wheel drive mode in response to excessive speed differentiation between said first and second output shafts.

9. A planetary gear assembly comprising:

a rotary input member;

a rotary output member;

a sun gear fixed for rotation with said input member;

a ring gear having external splines;

a carrier fixed for rotation with said output member;

a pinion gear rotatably supported from said carrier and meshed with said ring gear and said sun gear;

a first clutch plate fixed for rotation with said output member;

a second clutch plate fixed to a stationary component;

a range sleeve having internal splines meshed with said external splines of said ring gear such that said range sleeve is coupled for rotation with said ring gear and supported thereon for sliding movement between first and second positions, said range sleeve is operable in its first position to engage said first clutch plate such that said ring gear is coupled to said carrier for driving said output member at a first speed ratio in response to rotation of said input member, and said range sleeve is operable in its second position to engage said second clutch plate such that said ring gear is coupled to said stationary component for driving said output member at a second speed ratio in response to rotation of said input member;

a first synchronizer operable for synchronizing the rotary speed of said ring gear to that of said first clutch plate in response to movement of said range sleeve to its first position;

a second synchronizer operable for synchronizing the rotary speed of said ring gear to that of said stationary component in response to movement of said range sleeve to its second position; and a shift member for moving said range sleeve between its first and second positions.

10. The planetary gear assembly of claim 9 wherein said range sleeve is movable to a neutral position whereat said range sleeve is disengaged from both of said first and second clutch plates.

11. The planetary gear assembly of claim 9 further comprising a pair of thrust rings located on opposite lateral sides of said ring gear and which are fixed for rotation with said carrier, said thrust rings supporting said ring gear for rotation relative to said carrier while preventing axial movement of said ring gear.

12. The planetary gear assembly of claim 9 further comprising a hub fixed for rotation with said output member, and wherein said first clutch plate and said carrier are fixed for rotation with said hub.

13. The planetary gear assembly of claim 9 wherein said first synchronizer is disposed between said ring gear and said first clutch plate for inhibiting movement of said range sleeve into its first position until speed synchronization is established therebetween, and said second synchronizer is disposed between said ring gear and said second clutch plate for inhibiting movement of said range sleeve to its second position until speed synchronization is established therebetween.

14. The planetary gear assembly of claim 9 wherein said input member is an input shaft of a transfer case, said output member is an output shaft of said transfer case, and said stationary component is a housing of said transfer case.

15. A transfer case comprising:

an input shaft;

first and second output shafts;

a planetary gear assembly including a ring gear having external splines, a sun gear fixed for rotation with said input shaft, a carrier fixed for rotation with said second output shaft, and pinion gears rotatably supported from said carrier and meshed with said ring gear and said sun gear;

a first clutch plate fixed for rotation with said second output shaft;

a second clutch plate fixed to a stationary component;

a range sleeve having internal splines meshed with said external splines of said ring gear such that said range sleeve is coupled for rotation with said ring gear and is supported thereon for sliding movement between first and second positions, said range sleeve is operable in its first position to engage said first clutch plate such that said second output shaft is driven by said input shaft at a first speed ratio, and said range sleeve is operable in its second position to engage said second clutch plate such that said second output shaft is driven by said input shaft at a second speed ratio;

a first synchronizer operable for synchronizing the rotary speed of said ring gear to that of said first clutch plate in response to movement of said range sleeve to its first position;

a second synchronizer operable for synchronizing the rotary speed of said ring gear to that of said second clutch plate in response to movement of said range sleeve to its second position;

a shift mechanism for moving said range sleeve between said first and second positions; and a transfer mechanism for transferring drive torque from said second output shaft to said first output shaft.

16. The transfer case of claim 15 wherein said first synchronizer is disposed between said ring gear and said first clutch plate for inhibiting movement of said range sleeve into its first position until speed synchronization is established therebetween, and said second synchronizer is disposed between said ring gear and said second clutch plate for inhibiting movement of said range sleeve to its second position until speed synchronization is established therebetween.

17. The transfer case of claim 15 wherein said transfer mechanism includes a drive sprocket rotatably supported from said second output shaft, a driven sprocket fixed for rotation with said first output shaft, a transfer device interconnecting said driven sprocket to said drive sprocket, and a clutch for coupling said drive sprocket to said second output shaft.

18. The transfer case of claim 17 wherein said clutch is a mode clutch operable for selectively coupling said drive sprocket to said second output shaft to establish a part-time four-wheel drive mode, said mode clutch is operable for selectively uncoupling said drive sprocket from said second output shaft to establish a two-wheel drive mode.

19. The transfer case of claim 17 wherein said clutch is a transfer clutch operable for automatically coupling said drive sprocket to said second output shaft to establish an on-demand four-wheel drive mode in response to excessive speed differentiation between said first and second output shafts.

20. A transfer case comprising:

an input shaft;

first and second output shafts;

a hub rotatably supported on said second output shaft;

a planetary gear assembly including a ring gear, a sun gear fixed for rotation with said input shaft, a carrier fixed for rotation with said hub, and pinion gears rotatably supported from said carrier and meshed with said ring gear and said sun gear;

a first clutch plate fixed for rotation with said hub;

a second clutch plate fixed to a stationary member;

an interaxle differential having an input member coupled to said hub, a first output member coupled to said first output shaft, a second output member coupled to said second output shaft, and a gearset for transferring drive torque from said input member to said first and second output members while permitting speed differentiation therebetween;

a range sleeve coupled for rotation with said ring gear and supported for sliding movement thereon between first and second positions, said range sleeve is operable in its first position to engage said first clutch plate such that said input member of said interaxle differential is driven by said hub at a first speed ratio, and said range sleeve is operable in its second position to engage said second clutch plate such that said input member of said interaxle differential is driven by said hub at a second speed ratio;

a first synchronizer operable for synchronizing the rotary speed of said ring gear to that of said first clutch plate in response to movement of said range sleeve to its first position;

a second synchronizer operable for synchronizing the rotary speed of said ring gear to that of said second clutch plate in response to movement of said range sleeve to its second position; and a shift mechanism for moving said range sleeve between its first and second positions.

21. The transfer case of claim 20 wherein said first synchronizer is disposed between said ring gear and said first clutch plate for inhibiting movement of said range sleeve into its first position until speed synchronization is established therebetween, and said second synchronizer is disposed between said ring gear and said second clutch plate for inhibiting movement of said range sleeve to its second position until speed synchronization is established therebetween.

22. The transfer case of claim 20 further comprising a clutch for controlling torque distribution between said first and second output members of said interaxle differential.

23. The transfer case of claim 22 wherein said clutch comprises a mode clutch operable for selectively coupling any two of said input member and first and second output members of said interaxle differential to establish a locked four-wheel drive mode, and said mode clutch is further operable for uncoupling said two members of said interaxle differential to establish a full-time four-wheel drive mode.

24. The transfer case of claim 22 wherein said clutch is a biasing clutch including a clutch pack of interleaved clutch plates alternatively coupled for rotation with any two members of said interaxle differential, and a mechanism for exerting a clutch engagement force on said clutch pack to bias the torque distribution between said first and second output shafts in response to speed differentiation therebetween.

25. The transfer case of claim 24 wherein said mechanism includes a thrust plate engageable with said clutch pack, and an actuator for controlling movement of said thrust plate as a function of a speed differential signal supplied to a controller.

26. A transfer case for use in a four-wheel drive vehicle having a power source and first and second drivelines comprising:

a housing;

an input shaft rotatably supported by said housing and driven by the power source;

a first output shaft rotatably supported by said housing and connected to the first driveline;

a second output shaft rotatably supported by said housing and connected to the second driveline;

a planetary gear assembly having a sun gear fixed for rotation with said input shaft, a ring gear, a planet carrier fixed for rotation with said second output shaft and which rotatably supports planet gears that are meshed with said sun gear and said ring gear, and a pair of thrust rings located on opposite lateral sides of said ring gear and which are fixed for rotation with said planet carrier, said thrust rings supporting said ring gear for rotation relative to said planet carrier while preventing axial movement of said ring gear;

a first clutch plate fixed for rotation with one of said planet carrier and said second output shaft;

a second clutch plate fixed to said housing;

a range sleeve coupled for rotation with said ring gear and movable between a first range position and a second range position, said range sleeve is operable in said first range position to couple said ring gear for common rotation with said first clutch plate to establish a high-range drive mode, and said range sleeve is operable in said second range position to couple said ring gear to said second clutch plate to establish a low-range drive mode;

a shift system for moving said range sleeve between said first and second range positions to establish one of said high-range and low-range drive modes; and a transfer mechanism for transferring drive torque from said second output shaft to said first output shaft.

27. The transfer case of claim 26 further comprising a first synchronizer disposed between said range sleeve and said first clutch plate for inhibiting movement of said range sleeve into its first range position until speed synchronization is established therebetween, and a second synchronizer disposed between said range sleeve and second clutch plate for inhibiting movement of said range sleeve to its second range position until speed synchronization is established therebetween.

28. The transfer case of claim 26 wherein said ring gear has internal teeth meshed with external teeth of said planet gear, and said ring gear has external longitudinal splines meshed with internal longitudinal splines of said range sleeve.

29. The transfer case of claim 26 wherein said transfer mechanism includes a first sprocket rotatably supported from said second output shaft, a second sprocket fixed to said first output shaft, a power chain interconnecting said first sprocket to said second sprocket, and a clutch for rotatively coupling said second output shaft to said first sprocket.

30. The transfer case of claim 29 wherein said clutch is a mode clutch operable for selectively coupling said first sprocket to said second output shaft to establish a locked four-wheel drive mode, and wherein said mode clutch is operable for selectively uncoupling said first sprocket from said second output shaft to establish a two-wheel drive mode.

31. The transfer case of claim 29 wherein said clutch is a transfer clutch operable for automatically coupling said first sprocket to said second output shaft to establish an on-demand four-wheel drive mode in response to excessive speed differentiation between said first and second output shafts.

32. A planetary gear assembly comprising:

a rotary input member;

a rotary output member;

a sun gear fixed for rotation with said input member;

a ring gear;

a carrier fixed for rotation with said output member;

thrust rings located on opposite lateral sides of said ring gear and which are fixed for rotation with said carrier, said thrust rings supporting said ring gear for rotation relative to said carrier while preventing axial movement of said ring gear, a pinion gear rotatably supported from said carrier and meshed with said ring gear and said sun gear;

a first clutch plate fixed for rotation with one of said carrier and said output member;

a second clutch plate fixed to a stationary component;

a range sleeve coupled for rotation with said ring gear and supported thereon for sliding movement between first and second positions, said range sleeve is operable in its first position to engage said first clutch plate such that said ring gear is coupled to said carrier for driving said output member at a first speed ratio in response to rotation of said input member, and said range sleeve is operable in its second position to engage said second clutch plate such that said ring gear is coupled to said stationary component for driving said output member at a second speed ratio in response to rotation of said input member;

a first synchronizer operable for synchronizing the rotary speed of said ring gear to that of said first clutch plate in response to movement of said range sleeve to its first position;

a second synchronizer operable for synchronizing the rotary speed of said ring gear to that of said stationary component in response to movement of said range sleeve to its second position; and a shift member for moving said range sleeve between its first and second positions.

33. The planetary gear assembly of claim 32 wherein said first synchronizer is disposed between said ring gear and said first clutch plate for inhibiting movement of said range sleeve into its first position until speed synchronization is established therebetween, and said second synchronizer is disposed between said ring gear and said second clutch plate for inhibiting movement of said range sleeve to its second position until speed synchronization is established therebetween.

34. The planetary gear assembly of claim 32 wherein said input member is an input shaft of a transfer case, said output member is an output shaft of said transfer case, and said stationary component is a housing of said transfer case.

35. A planetary gear assembly comprising:

a rotary input member;

a rotary output member;

a sun gear fixed for rotation with said input member;

a ring gear;

a carrier fixed for rotation with said output member;

a pinion gear rotatably supported from said carrier and meshed with said ring gear and said sun gear;

a first clutch plate fixed for rotation with said output member;

a second clutch plate fixed to a stationary component;

a range sleeve coupled for rotation with said ring gear and supported thereon for sliding movement between first and second positions, said range sleeve is operable in its first position to engage said first clutch plate such that said ring gear is coupled to said carrier for driving said output member at a first speed ratio in response to rotation of said input member, and said range sleeve is operable in its second position to engage said second clutch plate such that said ring gear is coupled to said stationary component for driving said output member at a second speed ratio in response to rotation of said input member;

a first synchronizer disposed between said ring gear and said first clutch plate for inhibiting movement of said range sleeve to its first position until speed synchronization is established therebetween;

a second synchronizer disposed between said ring gear and said stationary component for inhibiting movement of said range sleeve to its second position until speed synchronization is established therebetween; and a shift member for moving said range sleeve between its first and second positions.

36. The planetary gear assembly of claim 35 wherein said input member is an input shaft of a transfer case, said output member is an output shaft of said transfer case, and said stationary component is a housing of said transfer case.

37. A transfer case comprising:

an input shaft;

first and second output shafts;

a planetary gear assembly including a ring gear, a sun gear fixed for rotation with said input shaft, a carrier fixed for rotation with said second output shaft, and pinion gears rotatably supported from said carrier and meshed with said ring gear and said sun gear;

a first clutch plate fixed for rotation with said second output shaft;

a second clutch plate fixed to a stationary component;

a range sleeve coupled for rotation with said ring gear and supported thereon for sliding movement between first and second positions, said range sleeve is operable in its first position to engage said first clutch plate such that said second output shaft is driven by said input shaft at a first speed ratio, and said range sleeve is operable in its second position to engage said second clutch plate such that said second output shaft is driven by said input shaft at a second speed ratio;

a first synchronizer operable for synchronizing the rotary speed of said ring gear to that of said first clutch plate in response to movement of said range sleeve to its first position;

a second synchronizer operable for synchronizing the rotary speed of said ring gear to that of said second clutch plate in response to movement of said range sleeve to its second position;

a shift mechanism for moving said range sleeve between said first and second positions; and a transfer mechanism for transferring drive torque from said second output shaft to said first output shaft, said transfer mechanism includes a drive sprocket rotatably supported from said second output shaft, a driven sprocket fixed for rotation with said first output shaft, a transfer device interconnecting said driven sprocket to said drive sprocket, and a transfer clutch for coupling said drive sprocket to said second output shaft, said transfer clutch is operable for automatically coupling said drive sprocket to said second output shaft to establish an on-demand four-wheel drive mode in response to excessive speed differentiation between said first and second output shafts.

38. The transfer case of claim 37 wherein said first synchronizer is disposed between said ring gear and said first clutch plate for inhibiting movement of said range sleeve into its first position until speed synchronization is established therebetween, and said second synchronizer is disposed between said ring gear and said second clutch plate for inhibiting movement of said range sleeve to its second position until speed synchronization is established therebetween.

39. A transfer case comprising:

an input shaft;

first and second output shafts;

a planetary gear assembly including a ring gear, a sun gear fixed for rotation with said input shaft, a carrier fixed for rotation with said second output shaft, and pinion gears rotatably supported from said carrier and meshed with said ring gear and said sun gear;

a first clutch plate fixed for rotation with said second output shaft;

a second clutch plate fixed to a stationary component;

a range sleeve coupled for rotation with said ring gear and supported thereon for sliding movement between first and second positions, said range sleeve is operable in its first position to engage said first clutch plate such that said second output shaft is driven by said input shaft at a first speed ratio, and said range sleeve is operable in its second position to engage said second clutch plate such that said second output shaft is driven by said input shaft at a second speed ratio;

a first synchronizer disposed between said ring gear and said first clutch plate for causing speed synchronization therebetween in response to movement of said range sleeve to its first position;

a second synchronizer disposed between said ring gear and said second clutch plate for causing speed synchronization therebetween in response to movement of said range sleeve to its second position;

a shift mechanism for moving said range sleeve between said first and second positions; and a transfer mechanism for transferring drive torque from said second output shaft to said first output shaft.

* * * * *